US009030408B2

(12) United States Patent
Latta et al.

(10) Patent No.: US 9,030,408 B2
(45) Date of Patent: May 12, 2015

(54) MULTIPLE SENSOR GESTURE RECOGNITION

(71) Applicants: Stephen G. Latta, Seattle, WA (US); Brian J. Mount, Seattle, WA (US); Adam G. Poulos, Redmond, WA (US); Jeffrey A. Kohler, Redmond, WA (US); Arthur C. Tomlin, Bellevue, WA (US); Jonathan T. Steed, Redmond, WA (US)

(72) Inventors: Stephen G. Latta, Seattle, WA (US); Brian J. Mount, Seattle, WA (US); Adam G. Poulos, Redmond, WA (US); Jeffrey A. Kohler, Redmond, WA (US); Arthur C. Tomlin, Bellevue, WA (US); Jonathan T. Steed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 13/689,524

(22) Filed: Nov. 29, 2012

(65) Prior Publication Data

US 2013/0328763 A1 Dec. 12, 2013

Related U.S. Application Data

(63) Continuation of application No. 13/275,190, filed on Oct. 17, 2011, now abandoned.

(51) Int. Cl.
*G06F 3/01* (2006.01)
(52) U.S. Cl.
CPC ...................................... *G06F 3/017* (2013.01)
(58) Field of Classification Search
CPC ....................................................... G06F 3/017
USPC ......................................................... 345/156
See application file for complete search history.

(56) References Cited

U.S. PATENT DOCUMENTS

| 5,442,376 | A | 8/1995 | Tannenbaum et al. |
| 5,495,576 | A | 2/1996 | Ritchey |
| 2009/0237564 | A1* | 9/2009 | Kikinis et al. ................ 348/584 |
| 2009/0243968 | A1 | 10/2009 | Nakazawa |
| 2010/0188328 | A1* | 7/2010 | Dodge et al. .................. 345/156 |
| 2010/0199230 | A1* | 8/2010 | Latta et al. ..................... 715/863 |
| 2010/0271302 | A1 | 10/2010 | Pering et al. |

(Continued)

OTHER PUBLICATIONS

"Kopin Golden-i Head-Mounted Display Delivers True Hands-free Mobility", Published on: Dec. 5, 2009, Available at: http://www.microsoft.com/casestudies/Case_Study_Detail.aspx?CaseStudyID=4000004231.

Hoff, William A., "Fusion of Data from Head-Mounted and Fixed Sensors", In Proceedings of First International Workshop on Augmented Reality, Nov. 1, 1998, 20 pages.

(Continued)

*Primary Examiner* — Stephen R. Koziol
*Assistant Examiner* — Delomia Gilliard
(74) *Attorney, Agent, or Firm* — Gregg Wisdom; Judy Yee; Micky Minhas

(57) ABSTRACT

Methods for recognizing gestures using adaptive multi-sensor gesture recognition are described. In some embodiments, a gesture recognition system receives a plurality of sensor inputs from a plurality of sensor devices and a plurality of confidence thresholds associated with the plurality of sensor inputs. A confidence threshold specifies a minimum confidence value for which it is deemed that a particular gesture has occurred. Upon detection of a compensating event, such as excessive motion involving one of the plurality of sensor devices, the gesture recognition system may modify the plurality of confidence thresholds based on the compensating event. Subsequently, the gesture recognition system generates a multi-sensor confidence value based on whether at least a subset of the plurality of confidence thresholds has been satisfied. The gesture recognition system may also modify the plurality of confidence thresholds based on the plugging and unplugging of sensor inputs from the gesture recognition system.

20 Claims, 17 Drawing Sheets

Multi-sensor gesture recognition system 600

(56) References Cited

U.S. PATENT DOCUMENTS

| | | |
|---|---|---|
| 2010/0306715 A1 | 12/2010 | Geisner |
| 2011/0109619 A1 | 5/2011 | Yoo et al. |
| 2011/0119640 A1 | 5/2011 | Berkes et al. |
| 2011/0285620 A1* | 11/2011 | Latta et al. .................... 345/156 |

OTHER PUBLICATIONS

Chow, Yang-Wai, "The WII Remote as an Input Device for 3D Interaction in Immersive Head-Mounted Display Virtual Reality", In Proceedings of International Conference Gaming, 2008, pp. 85-92.

U.S. Appl. No. 13/275,190, filed Oct. 17, 2011.

* cited by examiner

| Single-Sensor Gesture Confidence | Gesture Recognition Requirements for a "Virtual Object Selection" Gesture |
|---|---|
| 95% | Pointing at a particular virtual object is detected with a pointing angle error within +/- 3 degrees<br>AND<br>Person pointing is facing towards the virtual object<br>AND<br>Gesture is performed within a volume of space in front of the person's torso |
| 80% | Pointing at a particular virtual object is detected with a pointing angle error within +/- 10 degrees<br>AND<br>Person pointing is facing towards the virtual object |
| 60% | Pointing at a particular virtual object is detected with a pointing angle error within +/- 15 degrees |

FIG. 6B

| Multi-Sensor Gesture Confidence | Multi-Sensor Gesture Filter Requirements for a "Virtual Object Selection" Gesture |
|---|---|
| 95% | Gesture recognition determines with 95% confidence that a particular virtual object is being pointed to<br>AND<br>Motion recognition determines with 75% confidence that the person pointing is nodding their head<br>AND<br>Speech recognition determines with 95% confidence that the person nodding said "select" |
| 75% | Gesture recognition determines with 75% confidence that a particular virtual object is being pointed to<br>AND<br>Motion recognition determines with 75% confidence that a person is nodding their head<br>OR<br>Speech recognition determines with 75% confidence that the person nodding said "select" |

FIG. 6C

| Multi-Sensor Gesture Confidence | Multi-Sensor Gesture Filter Requirements for a "Virtual Object Selection" Gesture After Compensation |
|---|---|
| 95% | Gesture recognition determines with 99% confidence that a particular virtual object is being pointed to<br>AND<br>Motion recognition determines with 75% confidence that a person is nodding their head<br>AND<br>Speech recognition determines with 95% confidence that the person nodding said "select" |
| 75% | Gesture recognition determines with 90% confidence that a particular virtual object is being pointed to<br>AND<br>Motion recognition determines with 75% confidence that a person is nodding their head<br>OR<br>Speech recognition determines with 75% confidence that the person nodding said "select" |

FIG. 6D

MULTIPLE SENSOR GESTURE RECOGNITION

CLAIM OF PRIORITY

This application is a continuation application of co-pending U.S. patent application Ser. No. 13/275,190, entitled "MULTIPLE SENSOR GESTURE RECOGNITION," by Lata et al., filed Oct. 17, 2011, incorporated herein by reference in its entirety.

BACKGROUND

In a typical computing environment, users of a computing application, such as a multimedia application or a computer game, use an input device to control aspects of the computing application. Common input devices used to control a computing application include a controller, keyboard, joystick, remote, and mouse. More recently, computing applications have begun employing cameras and gesture recognition software to provide a natural user interface. With a natural user interface, a user's body parts and movements may be detected, interpreted, and used to control game characters or other aspects of a computing application.

SUMMARY

Technology is described for recognizing gestures using adaptive multi-sensor gesture recognition. In some embodiments, a gesture recognition system receives a plurality of sensor inputs from a plurality of sensor devices and a plurality of confidence thresholds associated with the plurality of sensor inputs. A confidence threshold specifies a minimum confidence value for which it is deemed that a particular gesture has occurred. Upon detection of a compensating event, such as excessive motion involving one of the plurality of sensor devices, the gesture recognition system may modify the plurality of confidence thresholds based on the compensating event. Subsequently, the gesture recognition system generates and outputs a multi-sensor confidence value based on whether at least a subset of the plurality of confidence thresholds has been satisfied. The gesture recognition system may also modify the plurality of confidence thresholds based on the plugging and unplugging of sensor inputs from the gesture recognition system.

One embodiment includes receiving a plurality of sensor inputs and acquiring one or more multi-sensor gesture filters associated with a particular gesture. The one or more multi-sensor gesture filters include a particular filter. The method further includes detecting that a new sensor input is available for recognizing the particular gesture, adding the new sensor input to the plurality of sensor inputs, updating the one or more multi-sensor gesture filters in response to the new sensor input, generating a plurality of single-sensor gesture recognition results based on the plurality of sensor inputs, determining that the particular filter is satisfied based on the plurality of single-sensor gesture recognition results, and executing a new computing application or command in response to the determining that the particular filter is satisfied.

One embodiment includes receiving a plurality of sensor inputs and acquiring one or more multi-sensor gesture filters associated with a particular gesture. A particular filter of the one or more multi-sensor gesture filters includes one or more parameters for determining when the particular gesture has been recognized. The method further includes detecting that a new sensor input is available for recognizing the particular gesture, adding the new sensor input to the plurality of sensor inputs, updating the one or more multi-sensor gesture filters in response to the new sensor input, generating a plurality of single-sensor gesture recognition results, determining that the particular filter is satisfied based on the one or more parameters and the plurality of single-sensor gesture recognition results, and executing a new computing application or command in response to the determining that the particular filter is satisfied.

One embodiment includes receiving a plurality of sensor inputs including a first input and a second input and acquiring one or more multi-sensor gesture filters associated with the particular gesture. A particular filter of the one or more multi-sensor gesture filters includes a first confidence threshold and a second confidence threshold. The method further includes detecting that a new sensor input is available for recognizing the particular gesture, adding the new sensor input to the plurality of sensor inputs, updating the one or more multi-sensor gesture filters in response to the new sensor input, determining a first confidence value that the particular gesture has occurred based on the first input, determining a second confidence value that the particular gesture has occurred based on the second input, generating a multi-sensor confidence value based on whether the first confidence value is equal to or greater than the first confidence threshold and whether the second confidence value is equal to or greater than the second confidence threshold, and outputting the multi-sensor confidence value.

One embodiment includes receiving a plurality of sensor inputs including a first input and a second input and acquiring one or more multi-sensor gesture filters associated with a particular gesture. A particular filter of the one or more multi-sensor gesture filters includes a first confidence threshold and a second confidence threshold. The method further includes detecting a compensating event, updating the first confidence threshold based on the compensating event, determining a first confidence value that the particular gesture has occurred based on the first input, determining a second confidence value that the particular gesture has occurred based on the second input, generating a multi-sensor confidence value based on whether the first confidence value is equal to or greater than the first confidence threshold and whether the second confidence value is equal to or greater than the second confidence threshold, and outputting the multi-sensor confidence value.

One embodiment includes a first sensor, a second sensor, a memory, and one or more processors. The first sensor generates a first input. The second sensor generates a second input. The memory stores one or more multi-sensor gesture filters. The one or more multi-sensor gesture filters include a particular filter. The particular filter includes a first confidence threshold and a second confidence threshold. The one or more processors detect a compensating event, update the first confidence threshold based on the compensating event, determine a first confidence value that the particular gesture has occurred based on the first input, determine a second confidence value that the particular gesture has occurred based on the second input, and generate a multi-sensor confidence value based on whether the first confidence value satisfies the first confidence threshold and whether the second confidence value satisfies the second confidence threshold.

One embodiment includes receiving a plurality of sensor inputs including a first input and a second input, synchronizing the first input and the second input, and acquiring one or more multi-sensor gesture filters associated with a particular gesture. A particular filter of the one or more multi-sensor gesture filters includes a first confidence threshold and a second confidence threshold. The method further includes detecting a compensating event, increasing the first confidence threshold based on the compensating event, determining a first confidence value that the particular gesture has occurred based on the first input, determining a second confidence value that the particular gesture has occurred based on the second input, generating a multi-sensor confidence value based on whether the first confidence value satisfies the first confidence threshold and whether the second confidence value satisfies the second confidence threshold, determining a first period of time associated with the multi-sensor confidence value, and outputting the multi-sensor confidence value and the first period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6B depicts one example of a table showing single-sensor gesture confidence values and the corresponding gesture recognition requirements for recognizing a "virtual object selection" gesture.

FIG. 6C depicts one example of a table showing multi-sensor gesture confidence values and the corresponding multi-sensor gesture filter requirements for recognizing a "virtual object selection" gesture.

FIG. 6D depicts one example of a table showing multi-sensor gesture confidence values and the corresponding multi-sensor gesture filter requirements for recognizing a "virtual object selection" gesture after compensation has been applied.

DETAILED DESCRIPTION

Figure 1:
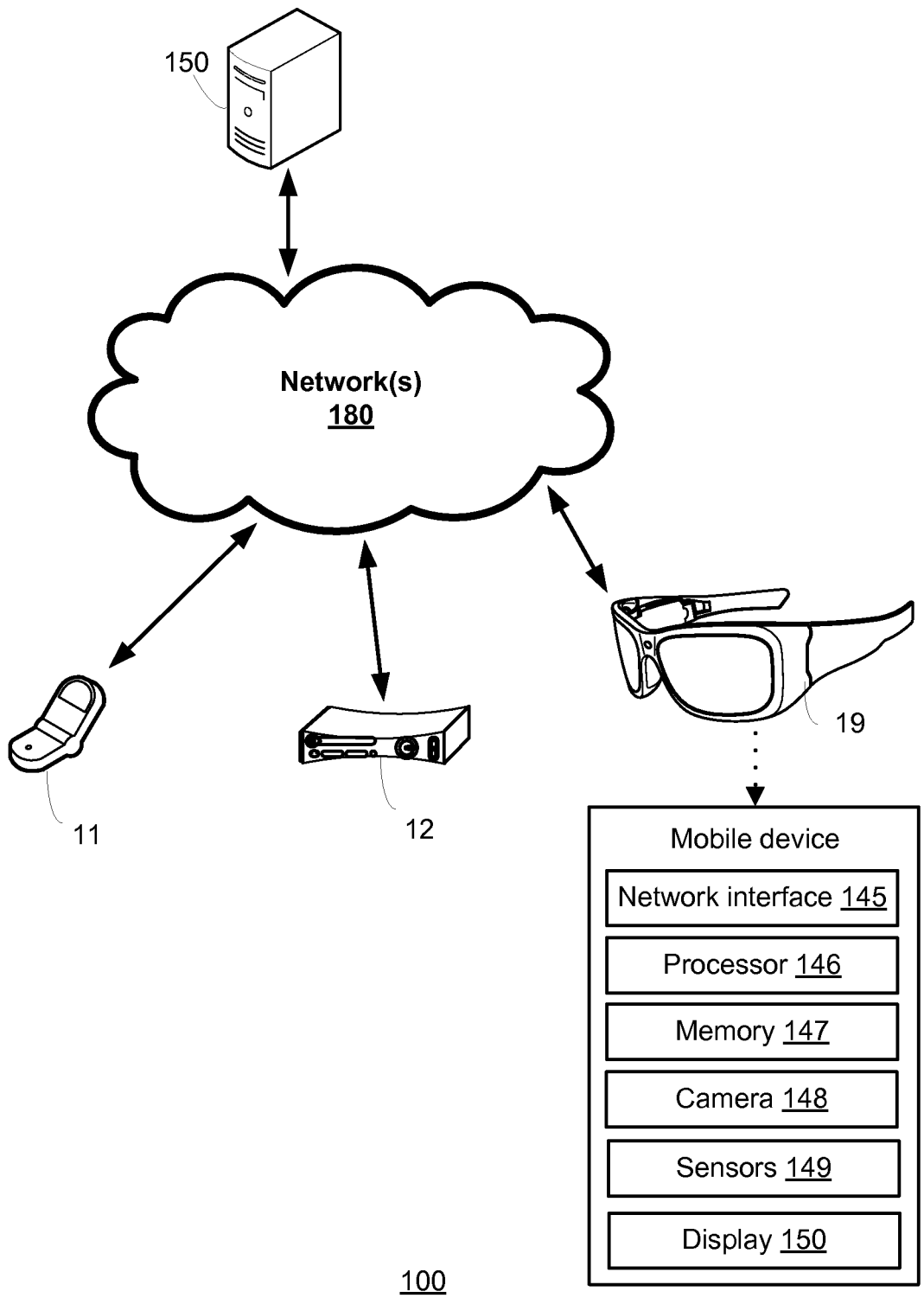
FIG. 1 is a block diagram of one embodiment of a networked computing environment in which the disclosed technology may be practiced.

Technology is described for recognizing gestures using adaptive multi-sensor gesture recognition. In some embodiments, a gesture recognition system receives a plurality of sensor inputs from a plurality of sensor devices and a plurality of confidence thresholds associated with the plurality of sensor inputs. A confidence threshold specifies a minimum confidence value for which it is deemed that a particular gesture has occurred. Upon detection of a compensating event, such as excessive motion involving one of the plurality of sensor devices, the gesture recognition system may modify the plurality of confidence thresholds based on the compensating event. Subsequently, the gesture recognition system generates and outputs a multi-sensor confidence value based on whether at least a subset of the plurality of confidence thresholds has been satisfied. The gesture recognition system may also modify the plurality of confidence thresholds based on the plugging and unplugging of sensor inputs from the gesture recognition system.

With the advent and proliferation of continuously-enabled and network-connected computing devices, such as head-mounted display devices (HMDs), the amount of information available to an end user of such computing devices at any given time is immense. In some cases, a mixed reality environment may be projected to the end user including a virtual computing device. The virtual computing device may appear to the end user as a projected user interface for controlling various computing applications. In one example, the projected user interface may appear as an interface to a tablet computer. The end user may control the virtual computing device using a natural user interface in which the end user's body parts and movements (i.e., gestures) may be detected, interpreted, and used to control the virtual computing device.

A computing device utilizing a natural user interface may receive one or more sensor inputs from one or more sensing devices. The one or more sensor inputs may provide sensing information necessary to infer the intent of the end user interacting with the computing device (e.g., that the end user has performed a particular gesture in order to control the computing device). The one or more sensing devices may include, for example, one or more depth sensors, image sensors, IR sensors, inertial measurement units (IMUs), inward facing eye tracking systems, microphones, touch screens, keyboards, mice, controllers, GPS devices, radio beacons, Wi-Fi devices, or cellular devices.

One issue involving the sensing information received from the one or more sensing devices is that the number of one or more sensor inputs available to the computing device may change over time as sensing devices are plugged into or unplugged from the computing device. For example, due to movement of the computing device, a new sensing device may come within a wireless connection range of the computing device. In another example, due to loss of battery power, a connection to an existing sensing device may be lost.

Another issue involving the sensing information received from the one or more sensing devices is that the quality and/or reliability of the sensing information may vary greatly depending on the environment in which the sensing information was obtained. For example, the sensing information received may be influenced by excessive motion involving one of the one or more sensing devices, by temperature conditions associated with one of the one or more sensing devices, by lighting conditions associated with one of the one or more sensing devices, by mechanical or electrical sensor degradation over time, and by a low power mode of operation associated with one of the one or more sensing devices. Thus, there is a need for a computing device utilizing a natural user interface to detect and compensate for changes in the sensing information received from a plurality of sensor devices.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, computing environment 12, mobile device 19, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images or depth images. Sensors 149 may generate motion and/or orientation information associated with mobile device 19. Sensors 149 may comprise an inertial measurement unit (IMU). Display 150 may display digital images and/or videos. Display 150 may comprise a see-through display.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one example, mobile device 19 comprises an HMD that provides a mixed reality environment for an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing the HMD, the end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's field of view (e.g., a virtual menu that always appears in the top right corner of the end user's field of view regardless of how the end user turns their head or moves within the real-world environment). In one embodiment, environmental mapping of the real-world environment is performed by application server 150 (i.e., on the server side) while camera localization is performed on mobile device 19 (i.e., on the client side). The virtual objects may include a text description associated with a real-world object. The virtual objects may also include a virtual computing device, which will be described in further detail in reference to virtual computing device 27 in FIG. 3.

In some embodiments, a mobile device, such as mobile device 19, may be in communication with a server in the cloud, such as application server 150, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server.

Figure 2:
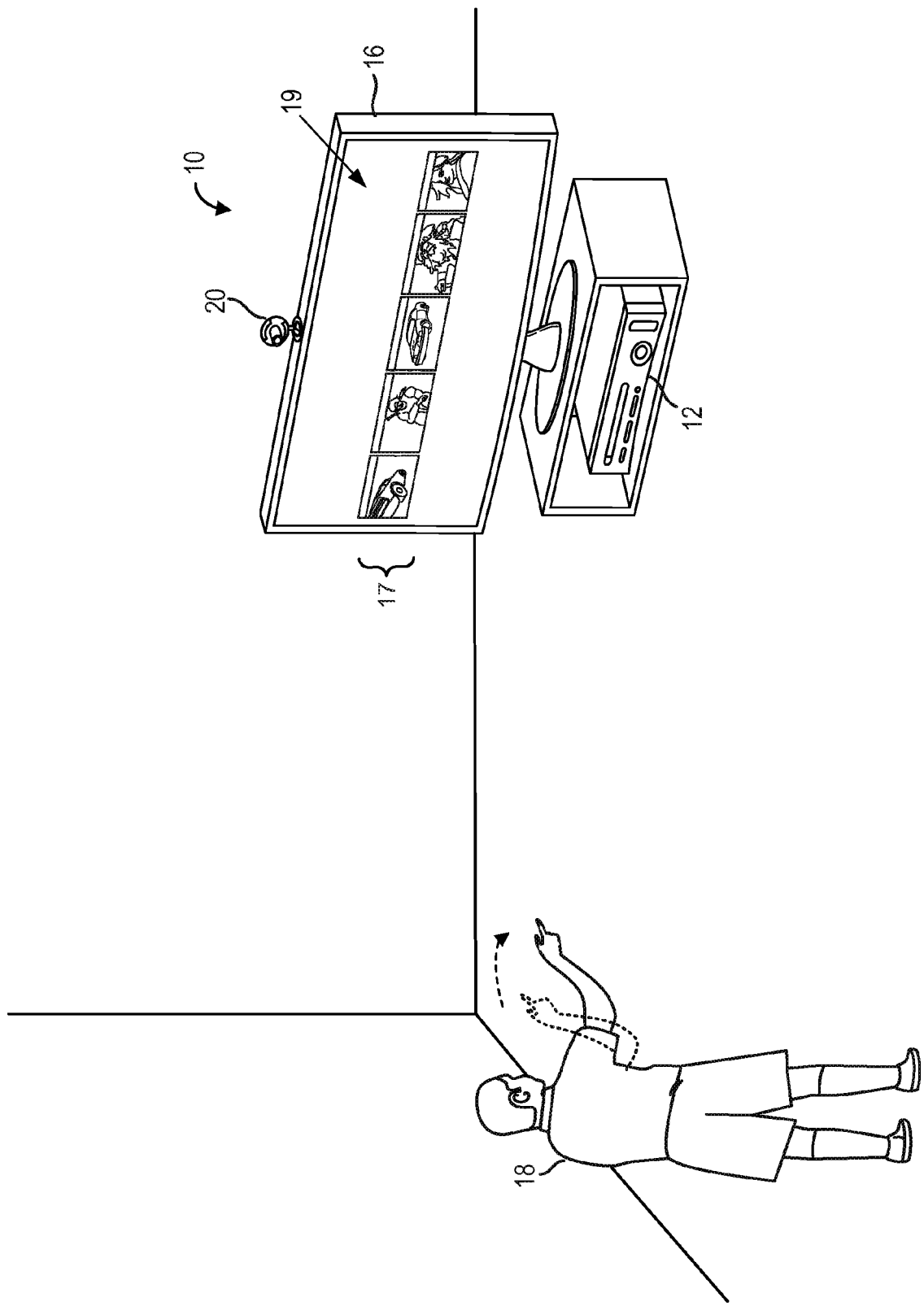
FIG. 2 depicts one embodiment of a computing system utilizing a natural user interface.

FIG. 2 depicts one embodiment of a computing system 10 utilizing a natural user interface. The computing system 10 may include a computing environment 12, a capture device 20, and a display 16, all in communication with each other. Computing environment 12 may include one or more processors. Capture device 20 may include one or more color or depth sensing cameras that may be used to visually monitor one or more targets including humans and one or more other real objects within a particular environment. Capture device 20 may also include a microphone. In one example, capture device 20 may include a depth sensing camera and a microphone and computing environment 12 may comprise a gaming console.

As depicted, a user interface 19 is displayed on display 16 such that an end user of the computing system 10 may control a computing application running on computing environment 12. The user interface 19 includes images 17 representing user selectable icons. In one embodiment, computing system 10 detects a particular gesture performed by end user 18 and executes a new computing application in response to the particular gesture being detected. The particular gesture may include selection of one of the user selectable icons. In some embodiments, computing system 10 performs gesture recognition using a plurality of sensor inputs received from capture device 20. The computing system 10 may detect and compensate for changes in sensing information received from capture device 20 while performing gesture recognition using the processes discussed herein. For example, computing system 10 may dynamically modify how a particular gesture is recognized based on which sensor inputs are available to computing system 10 at a particular point in time (e.g., due to sensor inputs being plugged into and/or unplugged from the computing system over time).

Figure 3:
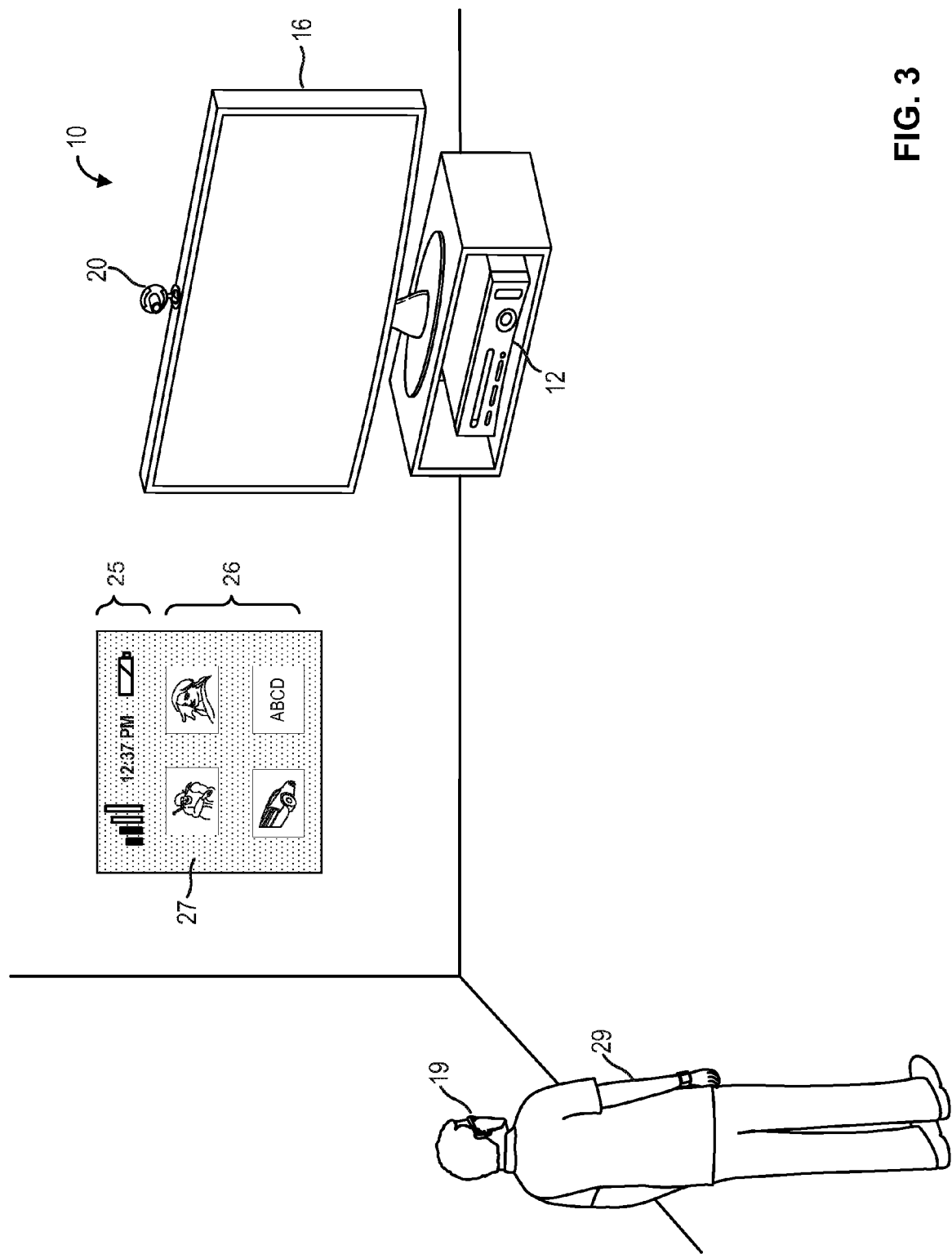
FIG. 3 depicts one embodiment of a mixed reality environment including a virtual computing device as perceived by an end user of a mobile device.

FIG. 3 depicts one embodiment of a mixed reality environment including a virtual computing device 27 as perceived by end user 29 of mobile device 19. The mobile device 19 may comprise an HMD. The virtual computing device 27 includes images 26 corresponding with user selectable icons and images 25 corresponding with a signal strength, time, and battery life associated with the virtual computing device 27. The virtual computing device 27 may appear to the end user 29 as being fixed in the real-world space or fixed with respect to a field of view of end user 29. The rendering of images associated with the virtual computing device 27 may be performed by mobile device 19 or by computing system 10. More information regarding the rendering of images in a mixed reality environment can be found in U.S. patent application Ser. No. 13/152,220, "Distributed Asynchronous Localization and Mapping for Augmented Reality," incorporated herein by reference in its entirety.

As depicted, end user 29 of mobile device 19 may control the virtual computing device 27 by performing one or more gestures. Gesture recognition of the one or more gestures may be performed by mobile device 19. Gesture recognition of the one or more gestures may also be performed by computing system 10. In some embodiments, mobile device 19 performs gesture recognition using a plurality of sensor inputs received from a variety of sensor devices. For example, mobile device 19 may receive audio information from a microphone embedded in mobile device 19 and receive depth information from computing system 10. In one embodiment, mobile device 19 may detect a particular gesture performed by end user 29 and execute a new computing application in response to the particular gesture being detected. The particular gesture may include selection of one of the user selectable icons associated with the virtual computing device 27. The mobile device 19 may detect and compensate for changes in sensing information received while performing gesture recognition using the processes discussed herein. For example, mobile device 19 may dynamically modify how a particular gesture is recognized based on a velocity or an acceleration associated with the mobile device.

Figure 4A:
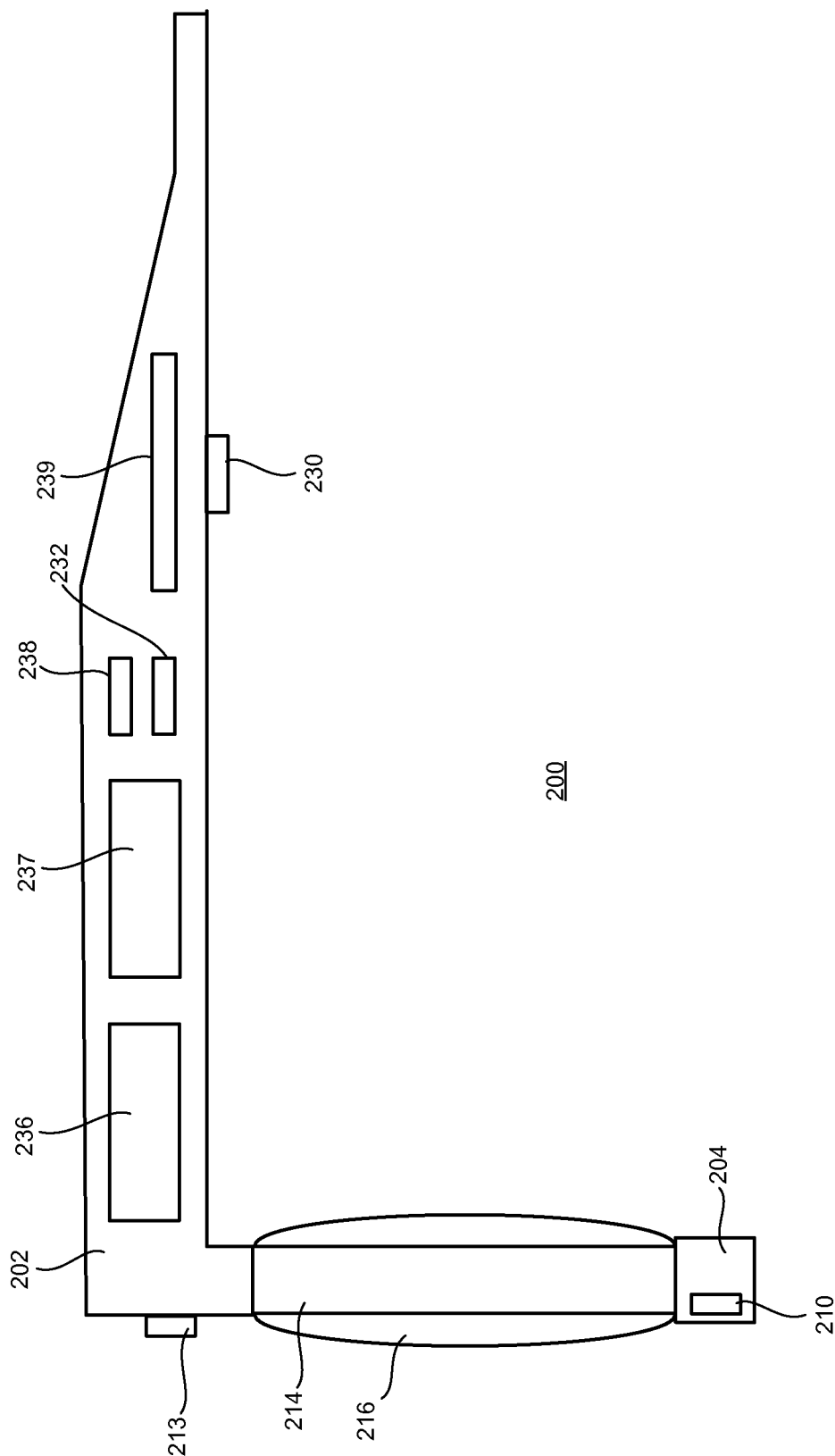
FIG. 4A depicts one embodiment of a portion of an HMD.

FIG. 4A depicts one embodiment of a portion of an HMD, such as mobile device 19 in FIG. 1. Only the right side of a head-mounted device is depicted. HMD 200 includes right temple 202, nose bridge 204, eye glass 216, and eye glass frame 214. Built into nose bridge 204 is a microphone 210 for recording sounds and transmitting the audio recording to processing unit 236. A front facing camera 213 is embedded inside right temple 202 for recording digital images and/or videos and transmitting the visual recordings to processing unit 236. Front facing camera 213 may capture color information, IR information, and/or depth information. Microphone 210 and front facing camera 213 are in communication with processing unit 236.

Also embedded inside right temple 202 are ear phones 230, motion and orientation sensor 238, GPS receiver 232, power supply 239, and wireless interface 237, all in communication with processing unit 236. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, eye glass 216 may comprise a see-through display, whereby images generated by processing unit 236 may be projected and/or displayed on the see-through display. The front facing camera 213 may be calibrated such that the field of view captured by the front facing camera 213 corresponds with the field of view as seen by a user of HMD 200. The ear phones 230 may be used to output virtual sounds associated with the images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3-D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

Figure 4B:
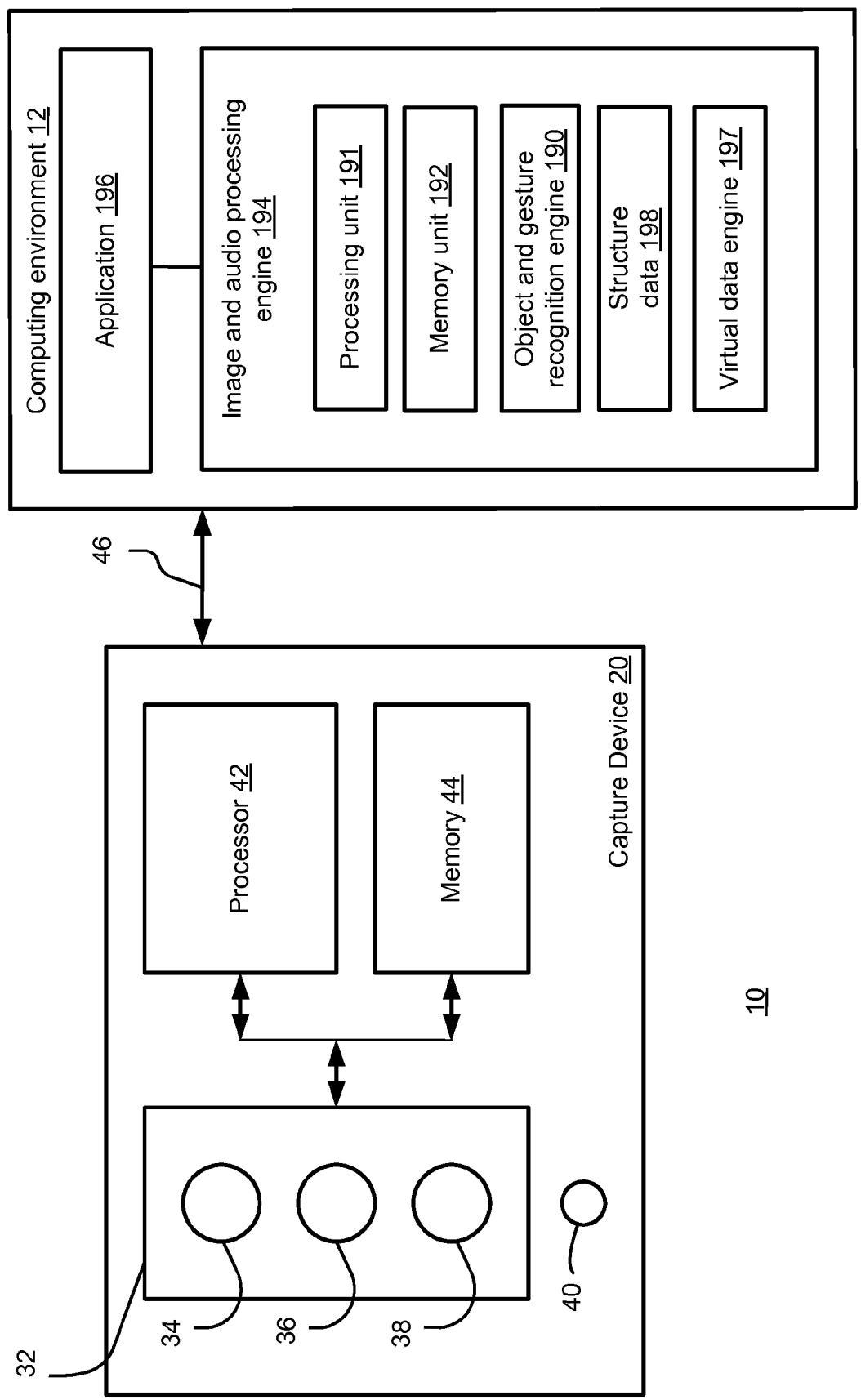
FIG. 4B illustrates one embodiment of a computing system including a capture device and a computing environment.

FIG. 4B illustrates one embodiment of computing system 10 including a capture device 20 and computing environment 12. In some embodiments, capture device 20 and computing environment 12 may be integrated within a single computing device. The single computing device may be a mobile device, such as mobile device 19 in FIG. 1.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32.

In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 4B, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 illustrated in FIG. 4B are housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As shown in FIG. 4B, computing environment 12 includes image and audio processing engine 194 in communication with application 196. Application 196 may comprise an operating system application or other computing application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting objects and performing gesture recognition can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 5A:
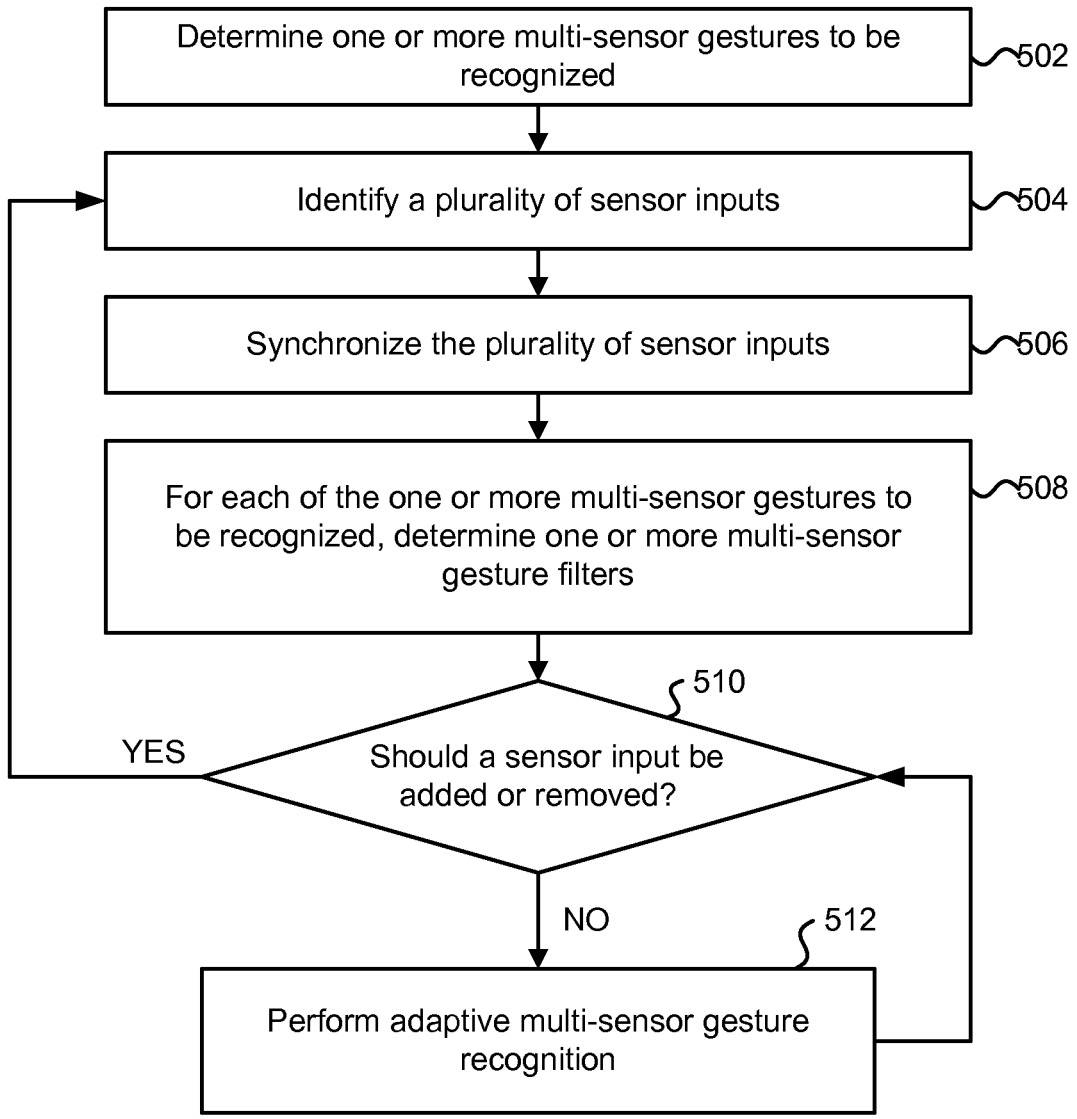
FIG. 5A is a flowchart describing one embodiment of a process for performing multi-sensor gesture recognition including updating one or more multi-sensor gesture filters based on the availability of sensor inputs.

FIG. 5A is a flowchart describing one embodiment of a process for performing multi-sensor gesture recognition including updating one or more multi-sensor gesture filters based on the availability of sensor inputs. The process of FIG. 5A may be performed continuously and by one or more computing devices. Each step in the process of FIG. 5A may be performed by the same or different computing devices as those used in other steps, and each step need not necessarily be performed by a single computing device. In one embodiment, the process of FIG. 5A is performed by a mobile device such as mobile device 19 in FIG. 1.

In step 502, one or more multi-sensor gestures to be recognized are determined. The determination of the one or more multi-sensor gestures to be recognized may be performed by a computing application running on a mobile device, such as mobile device 19 in FIG. 1. In one example, the computing application may generate a virtual computing device, such as virtual computing device 27 in FIG. 3. Based on the requirements of the virtual computing device, the computing application may determine one or more multi-sensor gestures necessary to control the virtual computing device. For example, the one or more multi-sensor gestures may include a first gesture to select a particular user selectable icon and a second gesture to present a new set of user selectable icons.

In one embodiment, the determination of the one or more multi-sensor gestures may depend on an identification of an end user controlling a computing device. The computing device may include a mobile device, such as mobile device 19 in FIG. 1, or a computing system, such as computing system 10 in FIG. 2. In one embodiment, facial and voice recognition techniques may be used to identify the end user. The end user may be identified as a particular person or as belonging to a particular group of people.

In step 504, a plurality of sensor inputs is identified. The plurality of sensor inputs may be identified based on the ability of one or more sensor inputs to provide sensing information to a computing device during a particular period of time. For example, the availability of a particular sensor input may change over time as the particular sensor device from which the particular sensor input is derived is plugged into or unplugged from the computing device. In one example, the number of one or more sensor inputs available to the computing device may increase due to a new sensing device being within a wireless connection range of the computing device. In another example, the number of one or more sensor inputs available to the computing device may decrease due to a lost connection with an existing sensing device caused by inadequate battery power or a physical disconnection.

In step 506, the plurality of sensor inputs is synchronized. In one example, each of the plurality of sensor inputs may be aligned or shifted in time with respect to a particular sensor input of the plurality of sensor inputs. The amount of time shifting may be determined using a static calibration process prior to operation of a computing device or using a dynamic calibration process that adjusts the amount of time shifting over time depending on patterns detected in the plurality of sensor inputs.

In step 508, one or more multi-sensor gesture filters are determined for each of the one or more multi-sensor gestures determined in step 502. Each of the one or more multi-sensor gestures to be recognized may be associated with a different set of multi-sensor gesture filters. In one example, the one or more multi-sensor gestures determined in step 502 may include a first gesture to select a particular user selectable icon. The one or more multi-sensor gesture filters associated with the first gesture may include a first filter and a second filter. The first filter may be associated with a higher multi-sensor gesture confidence value than the second filter. For example, the first filter may require that the first gesture be detected within each of the plurality of sensor inputs before recognizing the first gesture, while the second filter may require that the first gesture be detected within at least a subset of the plurality of sensor inputs before recognizing the first gesture.

In step 510, it is determined whether a sensor input should be added or removed from the plurality of sensor inputs. If it is determined that a sensor input should be added or removed, then step 504 is performed. Otherwise, if it is determined that a sensor input need not be added or removed, then step 512 is performed. In one embodiment, the determination of whether a sensor input should be added or removed is based on the existence of a connection with a sensing device from which the sensor input is derived.

In step 512, adaptive multi-sensor gesture recognition is performed. One or more outputs from the adaptive multi-sensor gesture recognition may include a confidence value that a particular gesture of the one or more multi-sensor gestures has been performed by an end user of a computing device and at what time the particular gesture was recognized as being performed. In one embodiment, the adaptive multi-sensor gesture recognition is based on the plurality of sensor inputs identified in step 504 and the one or more multi-sensor gesture filters associated with each of the one or more multi-sensor gestures to be recognized. After step 512 is performed step 510 is performed. Thus, as depicted, the process of performing multi-sensor gesture recognition in FIG. 5A continuously updates the one or more multi-sensor gesture filters over time based on the availability of sensor inputs.

Figure 5B:
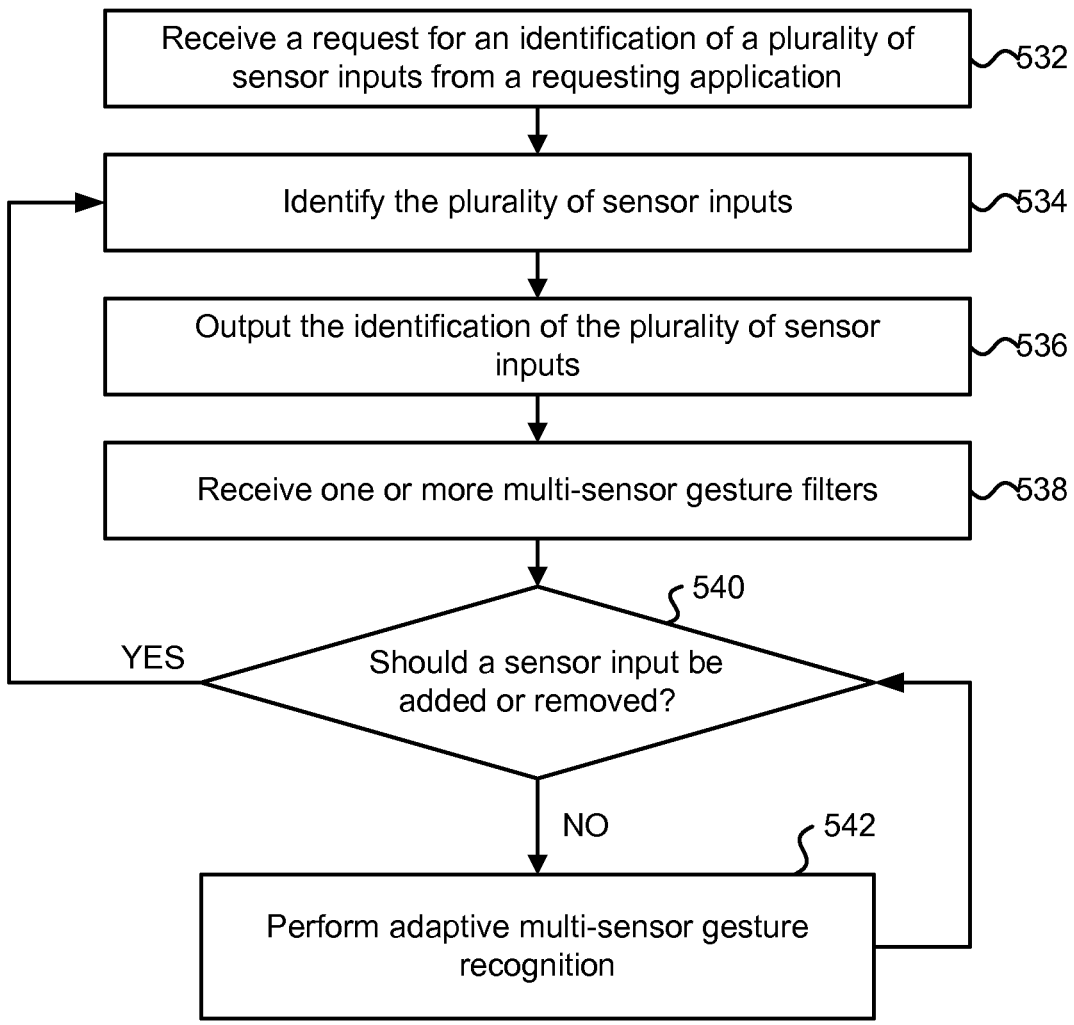
FIG. 5B is a flowchart describing an alternative embodiment of a process for performing multi-sensor gesture recognition.

FIG. 5B is a flowchart describing one embodiment of a process for performing multi-sensor gesture recognition. The process of FIG. 5B may be performed continuously and by one or more computing devices. Each step in the process of FIG. 5B may be performed by the same or different computing devices as those used in other steps, and each step need not necessarily be performed by a single computing device. In one embodiment, the process of FIG. 5B is performed by a mobile device such as mobile device 19 in FIG. 1.

As depicted in FIG. 5B, the process of performing multi-sensor gesture recognition includes interaction between a requesting application (e.g., a gaming application or work productivity application running on a computing device) and a multi-sensor gesture recognition engine performing adaptive multi-sensor gesture recognition.

In step 532, a request for an identification of a plurality of sensor inputs is received from a requesting application. The requesting application may include a gaming application, a work productivity application, or a social networking application. In one example, the requesting application may include a latency-intolerant mixed reality application providing a virtual computing device, such as virtual computing device 27 of FIG. 3. The requesting application may request the identification of the plurality of sensor inputs available to the multi-sensor gesture recognition engine based on runtime conditions associated with the requesting application. In one example, the options available to an end user controlling the requesting application may change over time prompting a new set of multi-sensor gestures to be recognized by the requesting application.

In step 534, the plurality of sensor inputs are identified. The plurality of sensor inputs may be identified based on the ability of one or more sensor inputs to provide sensing information to a computing device during a particular period of time. For example, the availability of a particular sensor input may change over time as the particular sensor device from which the particular sensor input is derived is plugged into or unplugged from the computing device. In one example, the number of one or more sensor inputs available to the computing device may increase due to a new sensing device being within a wireless connection range of the computing device. In another example, the number of one or more sensor inputs available to the computing device may decrease due to a lost connection with an existing sensing device caused by inadequate battery power or a physical disconnection.

In step 536, the identification of the plurality of sensor inputs is outputted to the requesting application. In step 538, one or more multi-sensor gesture filters are received from the requesting application based on the plurality of sensor inputs identified in step 534.

In step 540, it is determined whether a sensor input should be added or removed from the plurality of sensor inputs. If it is determined that a sensor input should be added or removed, then step 534 is performed. Otherwise, if it is determined that a sensor input need not be added or removed, then step 542 is performed. In one embodiment, the determination of whether a sensor input should be added or removed is based on the existence of a connection with a sensing device from which the sensor input is derived.

In step 542, adaptive multi-sensor gesture recognition is performed. One or more outputs from the adaptive multi-sensor gesture recognition may include a confidence value that a particular gesture has been performed by an end user of a computing device and at what time the particular gesture was recognized as being performed. The one or more outputs may be outputted to the requesting application. In one embodiment, the adaptive multi-sensor gesture recognition is based on the plurality of sensor inputs identified in step 534 and the one or more multi-sensor gesture filters received in step 538. After step 542 is performed step 540 is performed. Thus, as depicted, the process of performing multi-sensor gesture recognition in FIG. 5B continuously updates the one or more multi-sensor gesture filters over time based on the availability of sensor inputs.

Figure 5C:
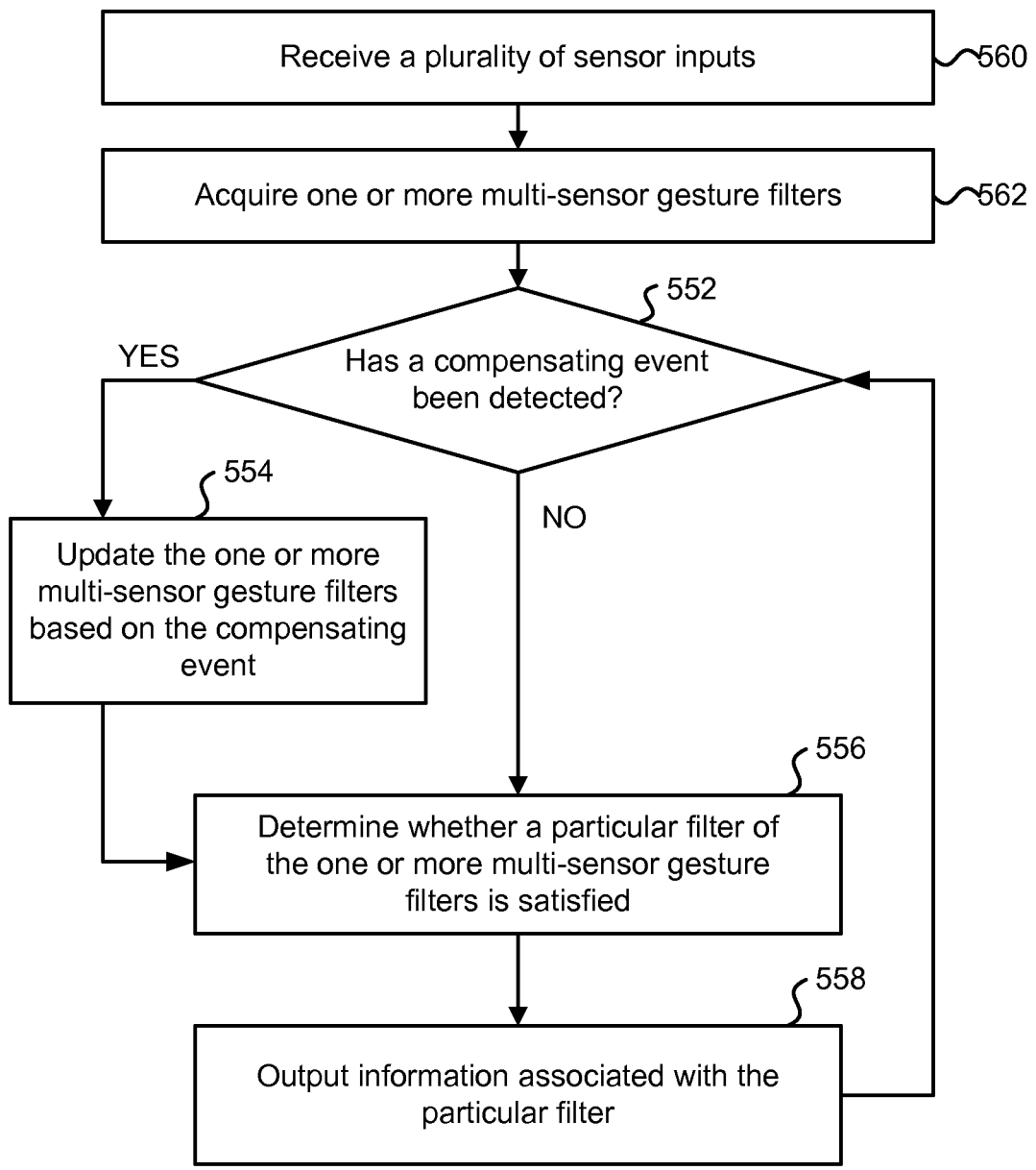
FIG. 5C is a flowchart describing one embodiment of a process for performing adaptive multi-sensor gesture recognition.

FIG. 5C is a flowchart describing one embodiment of a process for performing adaptive multi-sensor gesture recognition. The process described in FIG. 5C is one example of a process for implementing step 512 in FIG. 5A or for implementing step 542 in FIG. 5B. The process of FIG. 5C may be performed continuously and by one or more computing devices. Each step in the process of FIG. 5C may be performed by the same or different computing devices as those used in other steps, and each step need not necessarily be performed by a single computing device. In one embodiment, the process of FIG. 5C is performed by a mobile device such as mobile device 19 in FIG. 1.

In step 560, a plurality of sensor inputs is received. In one embodiment, each sensor input of the plurality of sensor inputs is received from a different sensing device of a plurality of sensing devices. The plurality of sensing devices may include one or more depth sensors, image sensors, IR sensors, inertial measurement units (IMUs), inward facing eye tracking systems, and microphones. In step 562, one or more multi-sensor gesture filters are acquired. The one or more multi-sensor gesture filters may be acquired from a requesting application running on a computing device performing adaptive multi-sensor gesture recognition.

In step 552, it is determined whether a compensating event has been detected. If a compensating event has been detected, then step 554 is performed. Otherwise, if a compensating event has not been detected, then step 556 is performed. In one embodiment, a compensating event may be detected if an environmental condition is detected that impacts the quality and/or reliability of sensing information included within the plurality of sensor inputs. In one example, a compensating event may be detected if a motion associated with one of the plurality of sensing devices is above a particular motion threshold for more than a particular period of time. A compensating event may also be detected if a lighting condition associated with one of the plurality of sensing devices is below a particular lighting threshold for more than a particular period of time. In another example, a compensating event may be detected if a temperature associated with one of the plurality of sensing devices is above or below a particular temperature threshold. A compensating event may also be detected if a low power mode of operation associated with one of the plurality of sensing devices is detected. A low power mode of operation may reduce the quality of sensing information provided from a particular sensing device or may reduce the rate at which sensing information is provided from the particular sensing device. In another example, a compensating event may be detected if data errors in the sensing information associated with one of the plurality of sensing devices are above a particular error threshold. The detection of data errors may be performed by utilizing error detection and/or correction codes.

In step 554, the one or more multi-sensor gesture filters are updated based on the compensating event detected in step 552. In one embodiment, a multi-sensor gesture filter may include one or more parameters for determining a multi-sensor gesture confidence. For example, a multi-sensor gesture filter may include one or more parameters such as a first confidence threshold and a second confidence threshold. The multi-sensor gesture filter may be updated by increasing or decreasing either the first confidence threshold and/or the second confidence threshold based on the compensating event. In one example, the first confidence threshold is increased by a scaled amount if the compensating event includes detecting a motion associated with a sensing device that is above a particular threshold for more than a particular period of time. The one or more parameters may also include weighted values for combining single-sensor gesture recognition results based on the plurality of sensor inputs.

In step 556, it is determined whether a particular filter of the one or more multi-sensor gesture filters is satisfied. In one embodiment, the particular filter is satisfied if a first confidence value that a particular gesture has occurred based on a first sensor input satisfies a first confidence threshold and a second confidence value that the particular gesture has occurred based on a second sensor input satisfies a second confidence threshold. In some embodiments, the determination that the particular filter is satisfied may be based on a plurality of single-sensor gesture recognition results. For example, the particular filter may be satisfied if a particular gesture is detected within any two or more of the plurality of sensor inputs.

In one embodiment, the particular filter may include one or more parameters for determining when the particular gesture has been recognized. The one or more parameters may include one or more confidence thresholds. A confidence threshold may represent a threshold value which must be met by a single-sensor gesture recognition engine in order for the particular gesture to have been deemed to have been detected by the single-sensor gesture recognition engine. The particular filter may be satisfied based on the one or more parameters as applied to one or more single-sensor gesture recognition results.

In some embodiments, each of the one or more multi-sensor gesture filters is applied in a particular order. The particular order may depend on a gesture confidence value associated with a particular filter. In one example, the particular order may begin with a particular filter with the highest multi-sensor gesture confidence and consider other filters with lower multi-sensor gesture confidences in a monotonically decreasing manner. In some cases, once a particular filter has been satisfied, the other filters that have not been applied and are associated with lower multi-sensor gesture confidence values may not need to be considered and the process may simply return information associated with the particular filter. In one embodiment, the particular order in which each of the one or more multi-sensor gesture filters is applied depends on a branching structure (e.g., represented as a directed acyclic graph) of the one or more multi-sensor gesture filters in which satisfaction of a first confidence threshold will determine which of the other one or more multi-sensor gesture filters are applied.

In step 558, information associated with the particular filter is outputted. The information outputted may include a multi-sensor gesture confidence value associated with a likelihood that the particular gesture was performed, a time associated with the particular gesture being recognized, a velocity or speed associated with a particular gesture, and/or a particular position associated with the particular gesture.

Figure 5D:
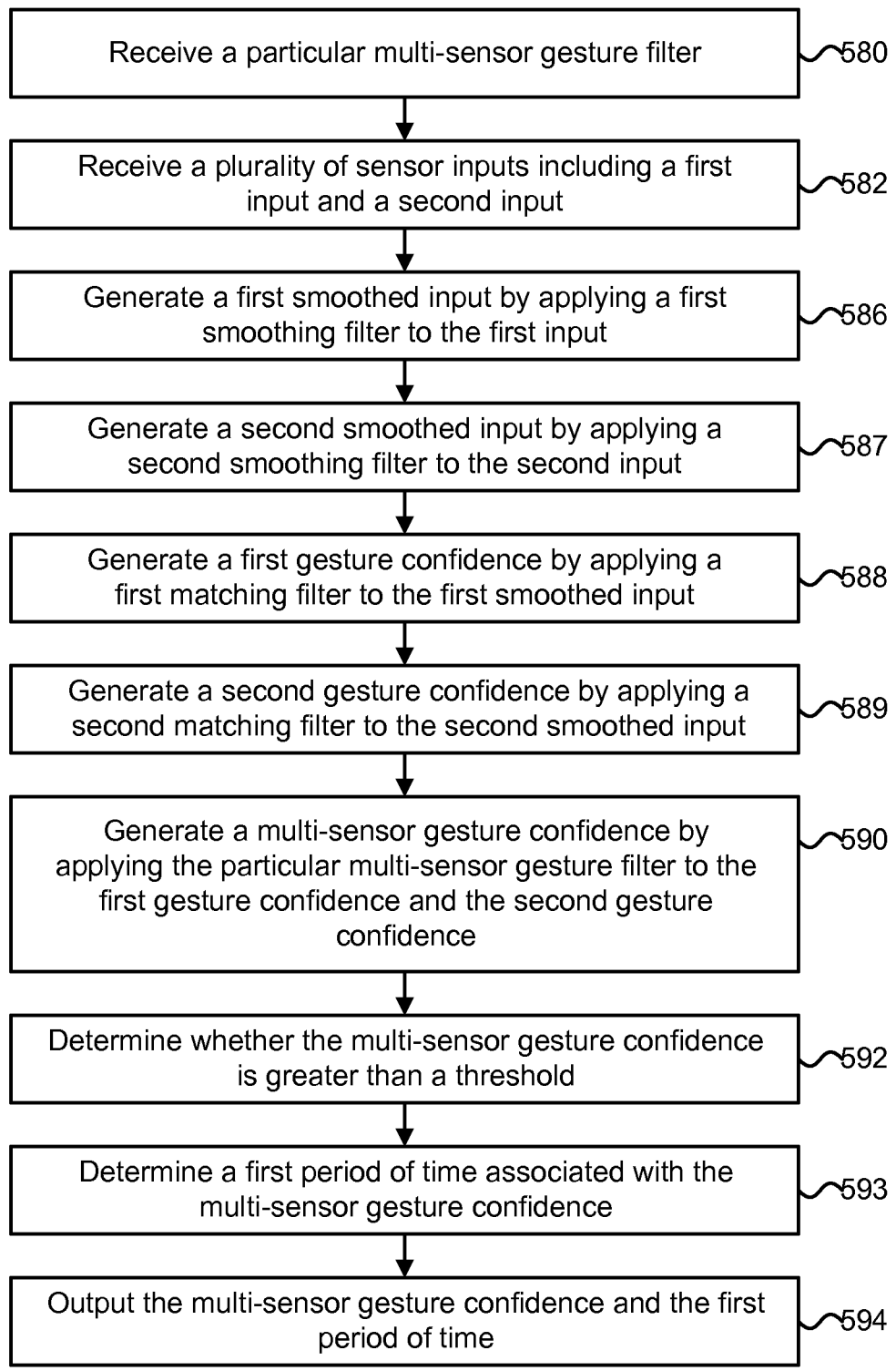
FIG. 5D is a flowchart describing one embodiment of a process for determining whether a particular multi-sensor gesture filter is satisfied.

FIG. 5D is a flowchart describing one embodiment of a process for determining whether a particular multi-sensor gesture filter is satisfied. The process described in FIG. 5D is one example of a process for implementing step 556 in FIG. 5C. The process of FIG. 5D may be performed continuously and by one or more computing devices. Each step in the process of FIG. 5D may be performed by the same or different computing devices as those used in other steps, and each step need not necessarily be performed by a single computing device. In one embodiment, the process of FIG. 5D is performed by a mobile device such as mobile device 19 in FIG. 1.

In step 580, a particular multi-sensor gesture filter is received. The particular multi-sensor gesture filter may be associated with a particular gesture. The particular multi-sensor gesture filter may be received from a requesting application. In step 582, a plurality of sensor inputs is received. The plurality of sensor inputs may include a first input and a second input. The plurality of sensor inputs may be derived from a plurality of sensor devices. In step 586, a first smoothed input is generated by applying a first smoothing filter to the first input. In step 587, a second smoothed input may be generated by applying a second smoothing filter to the second input. A smoothing filter reduces noise associated with a particular sensor input and may include, for example, a low pass filter, a moving average filter, and/or a Kalman filter. Other types of smoothing filters may also be applied.

In step 588, a first gesture confidence is generated by applying a first matching filter to the first smoothed input. In step 589, a second gesture confidence is generated by applying a second matching filter to the second smoothed input. A matching filter, such as the first matching filter and the second matching filter, may include a single-sensor gesture recognizer such as a gesture recognition engine, a motion recognition engine, or a speech recognition engine that operates on one of the plurality of sensor inputs. A matching filter may recognize the particular gesture associated with the particular multi-sensor gesture filter and output a single-sensor gesture confidence value. The particular gesture recognized may be an instantaneous gesture or a temporal gesture that occurs over a period of time.

In step 590, a multi-sensor gesture confidence is generated by applying the particular multi-sensor gesture filter to the first gesture confidence generated in step 588 and the second gesture confidence generated in step 589. In one embodiment, the particular multi-sensor gesture filter includes applying a weighted combination to the single-sensor gesture confidence values generated in steps 588 and 589.

In step 592, it is determined whether the multi-sensor gesture confidence is greater than a threshold. In step 593, a first period of time associated with the multi-sensor gesture confidence is determined. The first period of time may correspond to a point or range in time during which the particular multi-sensor gesture filter was satisfied. In step 594, the multi-sensor gesture confidence generated in step 590 and the first period of time determined in step 593 is outputted. The multi-sensor gesture confidence and the first period of time may be outputted to a requesting application for further processing by the requesting application.

Figure 6A:
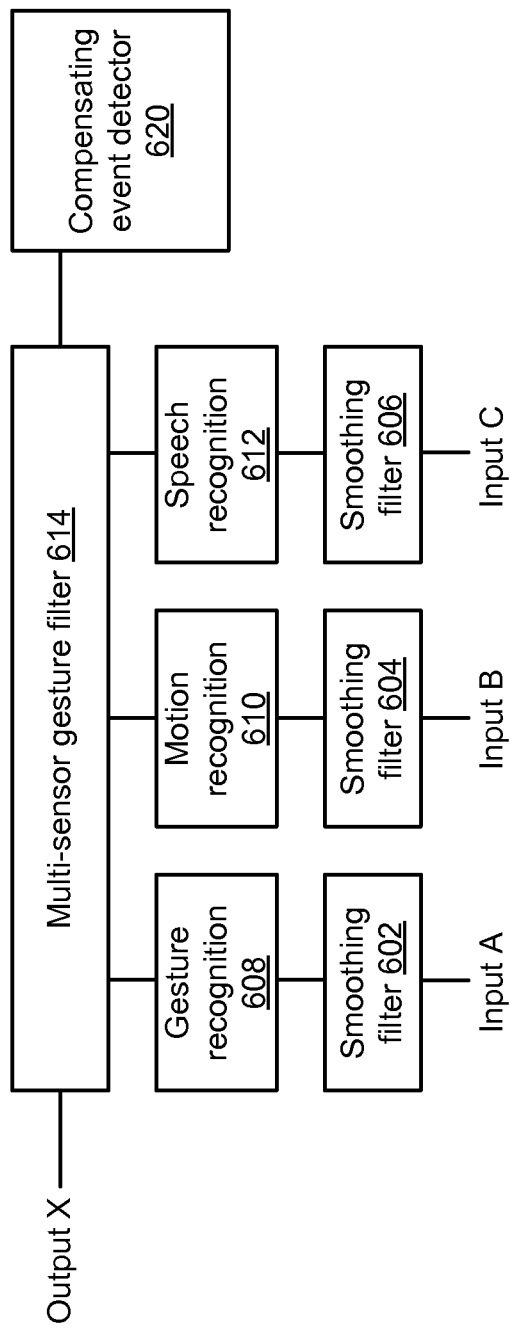
FIG. 6A depicts one embodiment of a multi-sensor gesture recognition system.

FIG. 6A depicts one embodiment of a multi-sensor gesture recognition system 600. The multi-sensor gesture recognition system 600 includes a multi-sensor gesture filter 614 in communication with a compensating event detector 620, a gesture recognition engine 608, a motion recognition engine 610, and a speech recognition engine 612. The multi-sensor gesture recognition system 600 also includes a smoothing filter 602 in communication with gesture recognition engine 608, a smoothing filter 604 in communication with motion recognition engine 610, and a smoothing filter 606 in communication with speech recognition engine 612.

Before being used as a sensor input by a single-sensor recognition engine, each of the sensor inputs "Input A," "Input B," and "Input C" is smoothed by applying a smoothing filter to each of the sensor inputs. As depicted, sensor input "Input A" is input to smoothing filter 602 to reduce noise associated with "Input A," sensor input "Input B" is input to smoothing filter 604 to reduce noise associated with "Input B," and sensor input "Input C" is input to smoothing filter 606 to reduce noise associated with "Input C." The degree of smoothing may be different for each of the sensor inputs and may be a function of the type of sensor input and/or the particular gesture being recognized. In one example, "Input A" may be derived from a depth sensor, "Input B" may be derived from an IMU, and "Input C" may be derived from a microphone.

In order to generate output "Output X," multi-sensor gesture filter 614 may combine the gesture recognition results from gesture recognition engine 608, motion recognition engine 610, and speech recognition engine 612 in accordance with one or more parameters. The one or more parameters may comprise varying weights to be given to each of the gesture recognition results. In one embodiment, multi-sensor gesture filter 614 may output that a particular gesture has been recognized if gesture recognition engine 608 determines with at least 90% confidence that the particular gesture has been recognized and either the motion recognition engine 610 or the speech recognition engine 612 determines with at least 50% confidence that the particular gesture has been recognized. In some embodiments, multi-sensor gesture filter 614 may output a multi-sensor gesture confidence value based on a weighted combination of the one or more parameters.

In some embodiments, multi-sensor gesture filter 614 may include a parameter table for storing the one or more parameters from which "Output X" is generated. Subsequently, compensating event detector 620 may detect a compensating event such as excessive motion associated with the sensor device from which "Input A" is derived. In response, multi-sensor gesture filter 614 may update at least a subset of the one or more parameters based on the compensating event.

In some embodiments, multi-sensor gesture filter 614 may utilize additional filtering mechanisms for performing multi-sensor gesture recognition. For example, the filtering mechanisms may utilize machine learning classification techniques such as support vector machines combined with pre-defined recorded ground truth gestures. Some filtering mechanisms may use a Hidden Markov Model to correctly filter infrequent combinations of sensor values. More information regarding filtering mechanisms can be found in U.S. Provisional Patent Application 61/493,857, "System For Recognizing An Open Or Closed Hand," incorporated herein by reference in its entirety.

FIG. 6B depicts one example of a table showing single-sensor gesture confidence values and the corresponding gesture recognition requirements for recognizing a "virtual object selection" gesture. The order in which the gesture recognition requirements are applied may depend on the gesture confidence value. For example, gesture recognition requirements associated with the highest single-sensor gesture confidence may be considered prior to considering other gesture recognition requirements associated with lower single-sensor gesture confidence values.

As depicted, a single-sensor gesture confidence value of 95% (the highest single-sensor gesture confidence value listed in FIG. 6B) will be outputted from a gesture recognition engine, such as gesture recognition engine 608 of FIG. 6A, if three conditions are satisfied. The three conditions include the detection of a person pointing at a particular virtual object with a pointing angle error within +/−3 degrees, the detection that the person pointing at the particular virtual object is facing towards the virtual object, and the detection that the pointing gesture is performed within a volume of space in front of the person's torso. A single-sensor gesture confidence value of 80% will be outputted from the gesture recognition engine if two conditions are satisfied. The two conditions include the detection of a person pointing at a particular virtual object with a pointing angle error within +/−10 degrees and the detection that the person pointing at the particular virtual object is facing towards the virtual object. A single-sensor gesture confidence value of 60% will be outputted from the gesture recognition engine if only a single condition is satisfied. The single condition includes the detection of a person pointing at a particular virtual object with a pointing angle error within +/−15 degrees. In some embodiments, the single-sensor gesture confidence value may be represented as a binary value (e.g., as a yes or no recognition value).

FIG. 6C depicts one example of a table showing multi-sensor gesture confidence values and the corresponding multi-sensor gesture filter requirements for recognizing a "virtual object selection" gesture. The order in which a particular multi-sensor gesture filter is applied may depend on the corresponding multi-sensor gesture confidence value. In one example, the multi-sensor gesture filter with the highest multi-sensor gesture confidence value will be considered prior to considering other multi-sensor gesture filters with lower multi-sensor gesture confidences values (i.e., considering the multi-sensor gesture filters in a monotonically decreasing manner).

As depicted, a multi-sensor gesture confidence value of 95% (the highest multi-sensor gesture confidence value listed in FIG. 6C) will be outputted from a multi-sensor gesture recognition engine, such as multi-sensor gesture recognition system 600 of FIG. 6A, if three conditions are satisfied within a particular period of time. The three conditions include that a gesture recognition engine determines with 95% confidence that a particular virtual object is being pointed to, that a motion recognition engine determines with 75% confidence that the person pointing is nodding their head, and that a speech recognition engine determines with 95% confidence that the person nodding said the word "select." A multi-sensor gesture confidence value of 75% will be outputted from the multi-sensor gesture recognition engine if three conditions are satisfied. The three conditions include that a gesture recognition engine determines with 75% confidence that a particular virtual object is being pointed to, that a motion recognition engine determines with 75% confidence that the person pointing is nodding their head, and that a speech recognition engine determines with 75% confidence that the person nodding said the word "select." In some embodiments, the multi-sensor gesture confidence value may be represented as a binary value (e.g., as a yes or no recognition value).

FIG. 6D depicts one example of a table showing multi-sensor gesture confidence values and the corresponding multi-sensor gesture filter requirements for recognizing a "virtual object selection" gesture after compensation has been applied. In this case, a compensating event has been detected associated with a sensor input from which the gesture recognition engine depends (e.g., due to excessive motion associated with a depth sensor). As depicted, only the confidence thresholds associated with the gesture recognition engine have been modified. The multi-sensor gesture filter requirements associated with the multi-sensor gesture confidence value of 95% are similar to those found in FIG. 6C, except that the gesture recognition engine must now determine with 99% confidence (rather than 95%) that a particular virtual object is being pointed to. The multi-sensor gesture filter requirements associated with the multi-sensor gesture confidence value of 75% are similar to those found in FIG. 6C, except that the gesture recognition engine must now determine with 90% confidence (rather than 75%) that a particular virtual object is being pointed to. In one embodiment not depicted, a multi-sensor gesture recognition system may alter the multi-sensor gesture confidence value associated with a particular multi-sensor gesture filter in order to compensate for a compensating event. For example, all multi-sensor gesture confidence values may be reduced by a scaling factor in order to compensate for the compensating event.

Figure 7A:
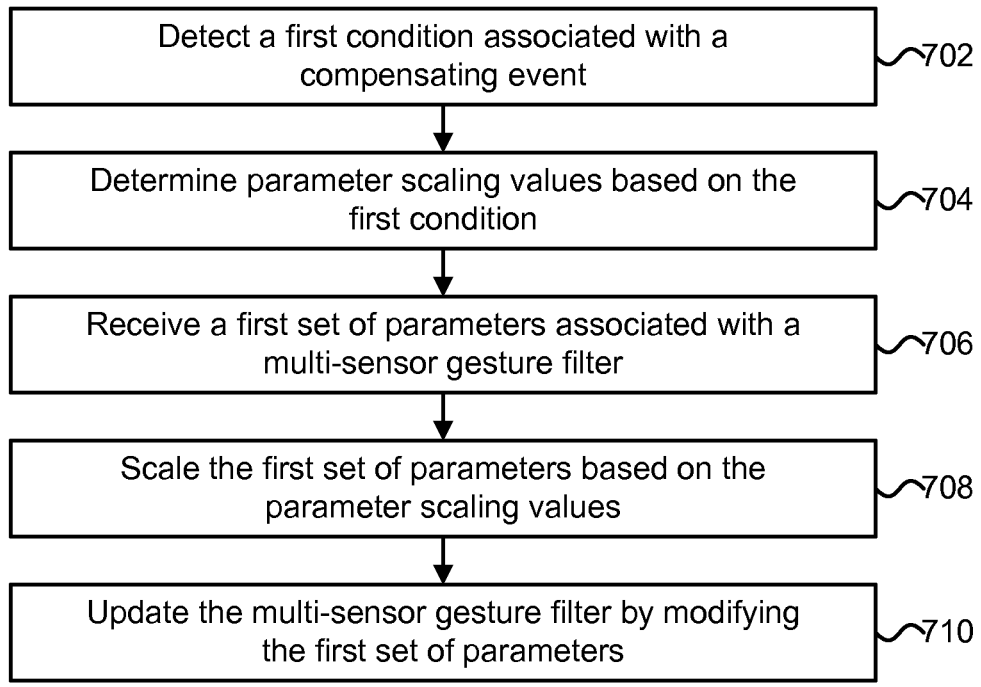
FIG. 7A is a flowchart describing one embodiment of a process for updating a multi-sensor gesture filter based on a compensating event.

FIG. 7A is a flowchart describing one embodiment of a process for updating a multi-sensor gesture filter based on a compensating event. The process described in FIG. 7A is one example of a process for implementing step 554 in FIG. 5C. The process of FIG. 7A may be performed continuously and by one or more computing devices. Each step in the process of FIG. 7A may be performed by the same or different computing devices as those used in other steps, and each step need not necessarily be performed by a single computing device. In one embodiment, the process of FIG. 7A is performed by a mobile device such as mobile device 19 in FIG. 1.

In step 702, a first condition associated with a compensating event is detected. The first condition may be detected by applying image and/or audio processing techniques to a plurality of sensor inputs. The first condition may include movement associated with a color or depth sensor that is above a particular threshold (e.g., due to excessive head movements), environmental lighting associated with a color sensor that is below a particular threshold (e.g., a person wearing an HMD enters a dark tunnel), or environmental noise associated with a microphone that is above a particular threshold (e.g., a person wearing an HMD enters a noisy environment).

In step 704, parameter scaling values based on the first condition are determined. The parameter scaling values may be determined by utilizing predetermined information regarding the properties or characteristics of a plurality of sensor inputs under motion, rotation, lighting, and/or temperature variations. In step 706, a first set of parameters associated with a multi-sensor gesture filter is received. In step 708, the first set of parameters are scaled based on the parameter scaling values determined in step 704. In step 710, the multi-sensor gesture filter is updated by modifying the first set of parameters in accordance with the parameter scaling values.

Figure 7B:
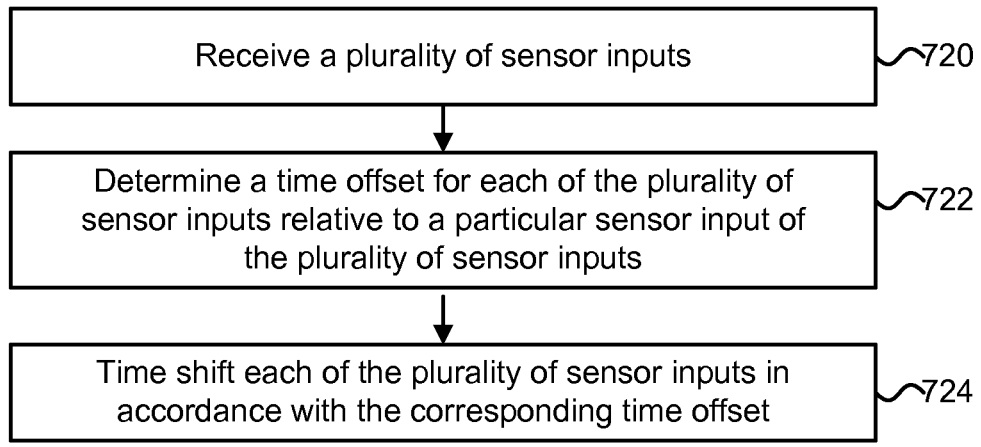
FIG. 7B is a flowchart describing one embodiment of a process for synchronizing a plurality of sensor inputs.

FIG. 7B is a flowchart describing one embodiment of a process for synchronizing a plurality of sensor inputs. The process described in FIG. 7B is one example of a process for implementing step 504 in FIG. 5A. The process of FIG. 7B may be performed continuously and by one or more computing devices. Each step in the process of FIG. 7B may be performed by the same or different computing devices as those used in other steps, and each step need not necessarily be performed by a single computing device. In one embodiment, the process of FIG. 7B is performed by a mobile device such as mobile device 19 in FIG. 1.

In step 720, a plurality of sensor inputs is received. In step 722, a time offset for each of the plurality of sensor inputs relative to a particular sensor input of the plurality of sensor inputs is determined. In one embodiment, the time offsets may be determined using a static calibration process prior to operation of a computing device or using a dynamic calibration process that adjusts the amount of time shifting over time depending on patterns detected in the plurality of sensor inputs. In some embodiments, a particular sensor input may be associated with a time stamp generated by a sensor device from which the particular sensor input was derived. In step 724, each of the plurality of sensor inputs is time shifted in accordance with the corresponding time offset determined in step 722.

Figure 8:
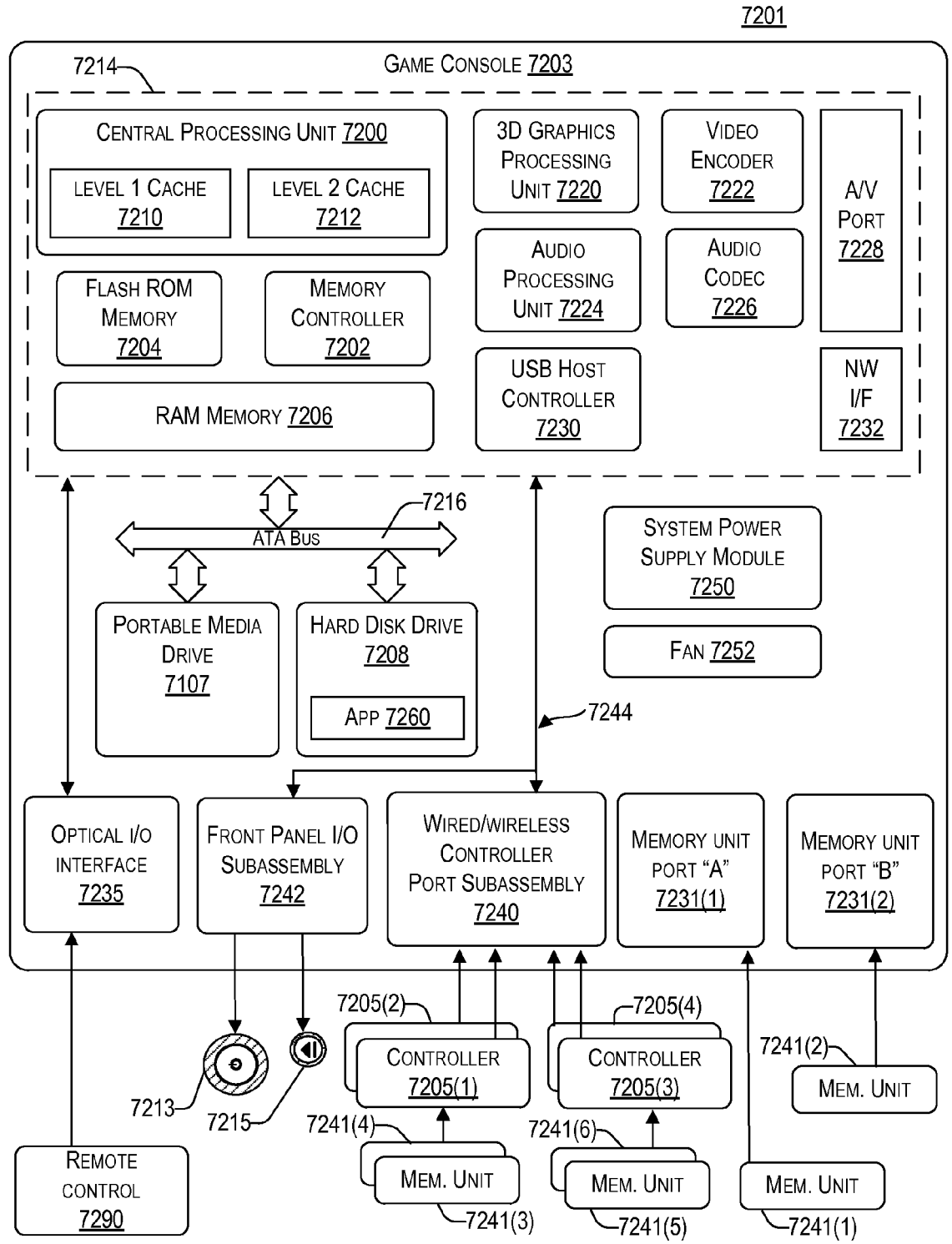
FIG. 8 is a block diagram of an embodiment of a gaming and media system.
Figure 9:
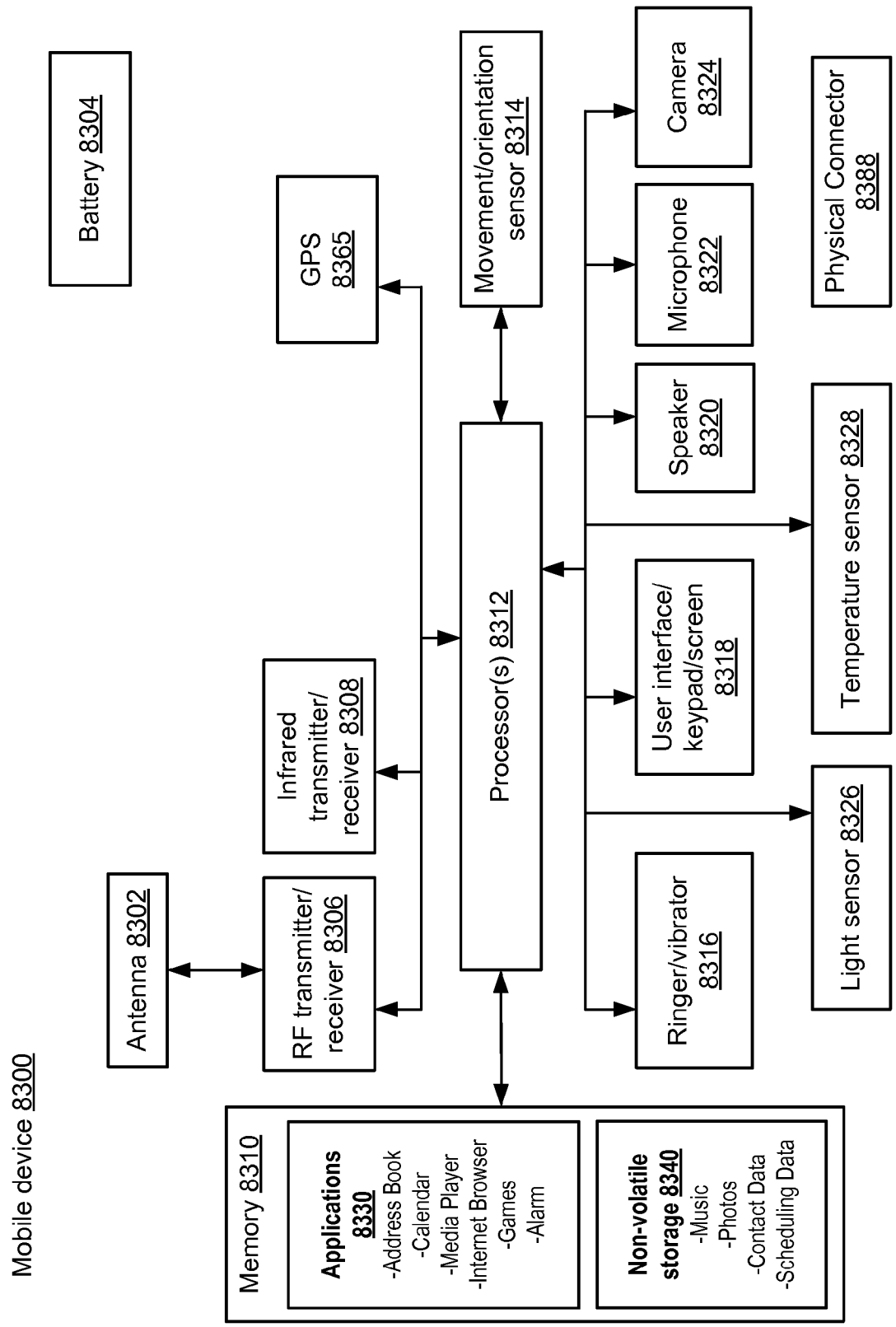
FIG. 9 is a block diagram of one embodiment of a mobile device.
Figure 10:
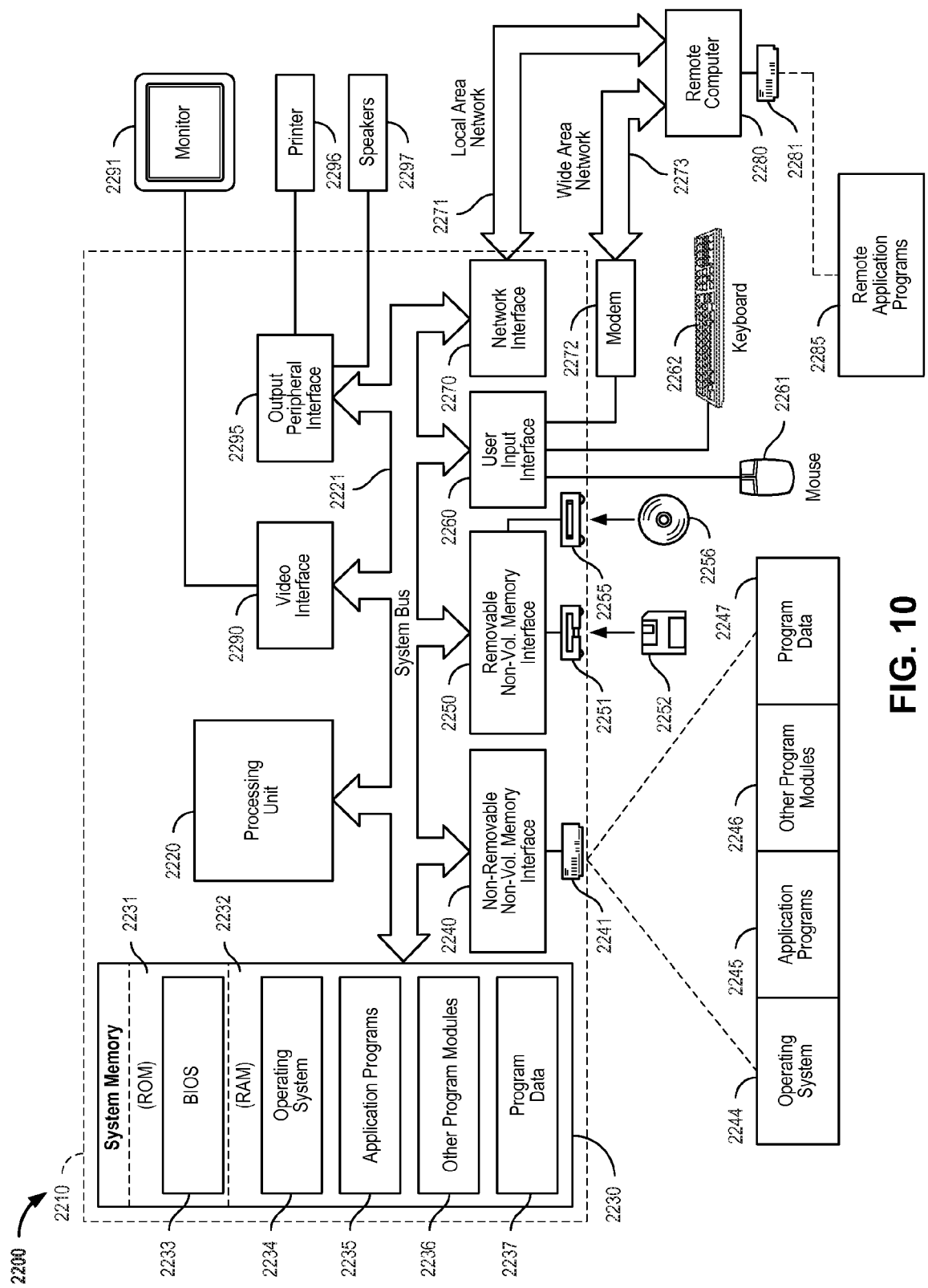
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201, which is one example of computing environment 12 in FIG. 3. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an NV (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing system 10 in FIG. 3. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recognizing a multi-sensor gesture, comprising:
    receiving a plurality of sensor inputs;
    acquiring a first confidence threshold for determining that a first gesture has been performed based on a first sensor input of the plurality of sensor inputs;
    acquiring a second confidence threshold for determining that a second gesture has been performed based on a second sensor input of the plurality of sensor inputs;
    detecting a compensating event for the first sensor input;
    increasing the first confidence threshold in response to detecting the compensating event;
    detecting that the first gesture has been performed based on the increased first confidence threshold and the first sensor input;
    detecting that the second gesture has been performed based on the second confidence threshold and the second sensor input;
    determining that the multi-sensor gesture has been performed in response to detecting that both the first gesture and the second gesture have been performed; and
    executing a command on a computing system in response to determining that the multi-sensor gesture has been performed.

2. The method of claim 1, further comprising:
    the first sensor input derives from a depth camera;
    the second sensor input derives from a microphone; and
    the determining that the multi-sensor gesture has been performed includes determining that a person has pointed to a particular virtual object using the first sensor input and that the person has said a particular word using the second sensor input.

3. The method of claim 1, wherein:
    the first sensor input derives from a depth camera; and
    the detecting a compensating event includes detecting that an acceleration of the depth camera was above a particular threshold.

4. The method of claim 1, wherein:
    the first sensor input derives from a depth sensor; and
    the detecting a compensating event includes detecting that a velocity of the depth sensor was above a particular threshold for more than a particular period of time.

5. The method of claim 1, wherein:
    the first sensor input derives from an image sensor; and
    the detecting a compensating event includes detecting a lighting condition associated with the image sensor that was below a particular threshold for more than a particular period of time.

6. The method of claim 1, wherein:
    the detecting a compensating event includes detecting that a temperature associated with the first sensor input was above a particular threshold for more than a particular period of time.

7. The method of claim 1, further comprising:
    determining a time difference between the first sensor input and the second sensor input; and
    time shifting the first sensor input by the time difference.

8. The method of claim 1, further comprising:
    receiving a request for an identification of the plurality of sensor inputs from a requesting application;
    identifying the plurality of sensor inputs in response to the receiving a request; and
    outputting the identification of the plurality of sensor inputs.

9. The method of claim 8, wherein:
    the identification of the plurality of sensor inputs includes an identification of each sensor input of the plurality of sensor inputs.

10. The method of claim 1, wherein:
    the increasing the first confidence threshold includes increasing the first confidence threshold from a first confidence value to a second confidence value greater than the first confidence value such that the minimum confidence value for detecting the first gesture using the first sensor input is increased.

11. An electronic device for recognizing a multi-sensor gesture, comprising:
    a first sensor, the first sensor generates a first sensor input;
    a second sensor, the second sensor generates a second sensor input;
    a memory, the memory stores a first confidence threshold for determining that a first gesture has been performed based on the first sensor input and a second confidence threshold for determining that a second gesture has been performed based on the second sensor input; and
    one or more processors, the one or more processors detect a compensating event for the first sensor input, the one or more processors increase the first confidence threshold in response to detecting the compensating event, the one or more processors detect that the first gesture has been performed based on the increased first confidence threshold and the first sensor input, the one or more processors detect that the second gesture has been performed based on the second confidence threshold and the second sensor input, the one or more processors determine that the multi-sensor gesture has been performed in response to detecting that both the first gesture and the second gesture have been performed.

12. The electronic device of claim 11, wherein:
    the first sensor input derives from a depth camera;
    the second sensor input derives from a microphone; and
    the one or more processors determine that a person has pointed to a particular virtual object using the first sensor input and that the person has said a particular word using the second sensor input, the one or more processors determine that the multi-sensor gesture has been performed in response to determining that the person has pointed to the particular virtual object and that the person has said the particular word.

13. The electronic device of claim 11, wherein:
    the first sensor includes a depth sensor; and
    the compensating event includes detecting that a velocity of the depth sensor was above a particular threshold for more than a particular period of time.

14. The electronic device of claim 11, wherein:
the compensating event includes detecting that a temperature of the first sensor was above a particular threshold for more than a particular period of time.

15. The electronic device of claim 11, wherein:
the one or more processors determine a time difference between the first sensor input and the second sensor input and synchronize the first sensor input and the second sensor input by time shifting the first sensor input by the time difference.

16. The electronic device of claim 11, wherein:
the first sensor includes a depth sensor; and
the one or more processors detect the compensating event by detecting that an acceleration of the depth sensor was above a particular threshold.

17. One or more storage devices containing processor readable code for programming one or more processors to perform a method for operating a multi-sensor gesture recognition system comprising:
receiving a plurality of sensor inputs, the plurality of sensor inputs includes a first sensor input and a second sensor input;
synchronizing the first sensor input and the second sensor input, the synchronizing includes determining a time difference between the first sensor input and the second sensor input and time shifting the first sensor input by the time difference;
acquiring a first confidence threshold for determining that a first gesture has been performed based on the first sensor input;
acquiring a second confidence threshold for determining that a second gesture has been performed based on the second sensor input;
detecting a compensating event for the first sensor input;
increasing the first confidence threshold in response to detecting the compensating event;
detecting that the first gesture has been performed based on the increased first confidence threshold and the first sensor input;
detecting that the second gesture has been performed based on the second confidence threshold and the second sensor input; and
determining that a multi-sensor gesture has been performed in response to detecting that both the first gesture and the second gesture have been performed.

18. The one or more storage devices of claim 17, wherein:
the first sensor input is derived from a depth sensor; and
the detecting a compensating event includes detecting that a velocity of the depth sensor was above a particular threshold for more than a particular period of time.

19. The one or more storage devices of claim 18, further comprising:
detecting that a new sensor input is available for recognizing the multi-sensor gesture;
adding the new sensor input to the plurality of sensor inputs; and
adjusting the second confidence threshold in response to adding the new sensor input to the plurality of sensor inputs.

20. The one or more storage devices of claim 17, wherein:
the first sensor input is derived from an image sensor; and
the detecting a compensating event includes detecting that a lighting condition associated with the image sensor was below a particular threshold for more than a particular period of time.

* * * * *